United States Patent [19]
Mandrick

[11] 4,248,474
[45] Feb. 3, 1981

[54] MAGNETIC SUN VISOR ATTACHMENT

[76] Inventor: Ann Mandrick, 659 Perkins Dr., Warren, Ohio 44483

[21] Appl. No.: 66,642

[22] Filed: Aug. 15, 1979

[51] Int. Cl.³ .............................................. B60J 3/00
[52] U.S. Cl. .............................. 296/97 G; 296/97 D; 296/97 F; 160/DIG. 3; 428/329; 428/900
[58] Field of Search ................ 296/97 F, 97 G, 97 C, 296/97 D; 160/DIG. 3; 428/900, 913, 329

[56] References Cited
U.S. PATENT DOCUMENTS
4,023,855   5/1977   Janata ................................. 296/97 C FOREIGN PATENT DOCUMENTS
1504700   3/1978   United Kingdom ................. 296/97 G Primary Examiner—Robert R. Song
Attorney, Agent, or Firm—Webster B. Harpman

[57] ABSTRACT

A vehicle sun visor is provided with several generally rectangular visor extensions, each of which is formed of a transparent shaded synthetic resin material, the shading comprising extremely fine evenly dispersed magnetizable powder, such as ALNICO, or iron. A section of the material after the magnetizable powder has been magnetized by electromagnetic means is attached to the conventional sun visor and the additional generally rectangular sections are adjustably positioned thereon or one upon another as desired to effect a desirable sun screen and/or glare shield for the driver of the vehicle.

4 Claims, 4 Drawing Figures

U.S. Patent     Feb. 3, 1981     4,248,474
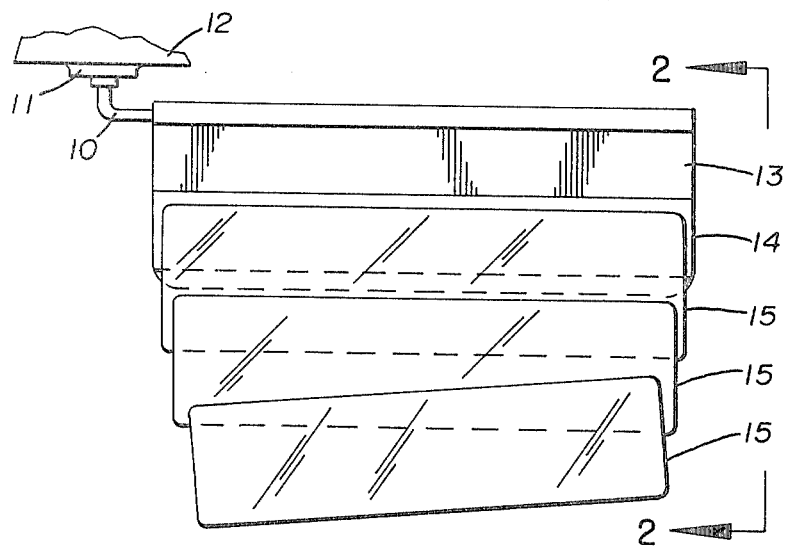
FIG. 1
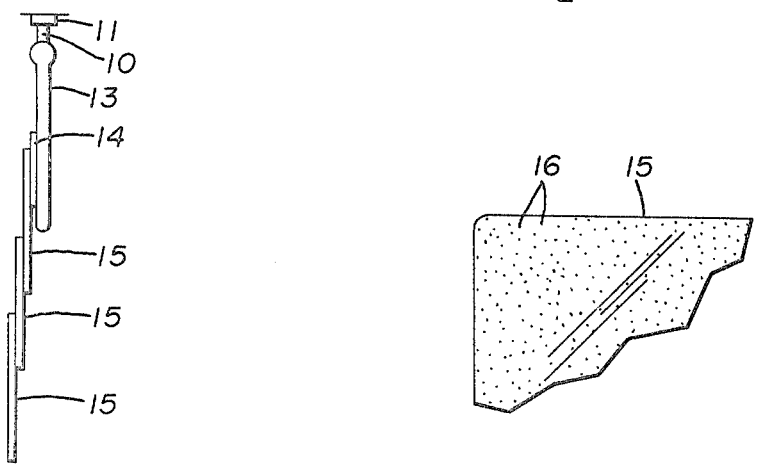
FIG. 2
FIG. 3
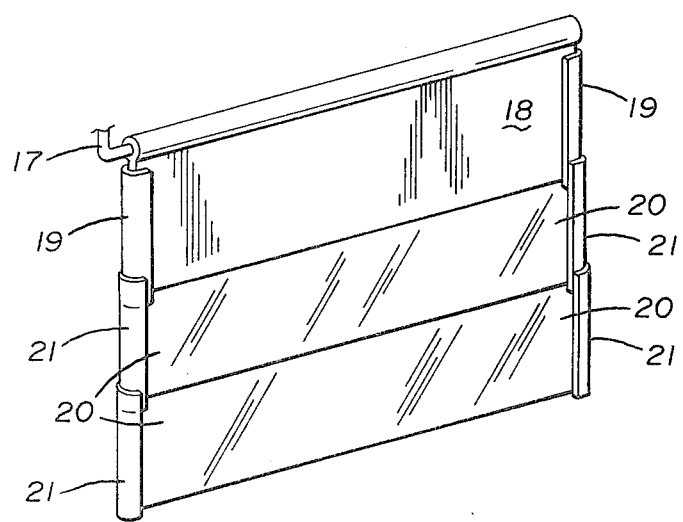
FIG. 4

MAGNETIC SUN VISOR ATTACHMENT

BACKGROUND OF THE INVENTION

1. Field of the Invention

This invention relates to sun shields or glare shields for automotive vehicles and wherein light intercepting devices are adjustably attached to the conventional visor.

2. Description of the Prior Art:

Many attachments for vehicle sun visors have been known in the art. Typical are the opaque attachments which are hinged, clamped, or slidably affixed mechanically to the visors and as seen for example in U.S. Pat Nos. 2,304,677; 2,842,197; 2,701,612 and 2,829,919. Some of these patents have incorporated shaded or semi-transparent attachments and various mechanical devices have been employed to mount the attachments on the conventional visor. On prior art patent affixes a semi-transparent attachment to a visor magnetically as in U.S. Pat. No. 2,603,530 by providing unitary magnets affixed to the semi-transparent material by adhesive means.

The present invention forms a new and useful attachment for a sun visor by adding a desirable quantity of finely powdered ALNICO or iron powder to a clear plastic synthetic resin in an amount that may be magnetized to enable the material to be self-adhering magnetically to a suitable object such as another piece of the same material or any ferrous material and at the same time provides the sun shade or glare shield characteristic by the physical presence of the fine powdered ALNICO or iron as the case may be while maintaining suitable transparency to the desired degree.

None of the prior art patents disclose the simple expediency of providing the dual function of light or glare control and magnetizable qualities through the introduction of a magnetizable powder into a clear plastic in sheet form.

SUMMARY OF THE INVENTION

A magnetic sun visor attachment comprises several generally rectangular sections of synthetic resin of a suitable transparency containing finely powdered magnetizable material acting as a light and/or glare shield and enabling the material to be attached by magnetic attachment to a similar piece of material or any ferrous metal object.

DESCRIPTION OF THE DRAWINGS

FIG. 1 is a front elevational view of a sun visor having a plurality of sections of light controlling transparent magnetizable plastic sheet material adjustably secured to one another;

FIG. 2 is an end elevation on line 2—2 of FIG. 1;

FIG. 3 is an enlarged detail of an exaggerated showing of the magnetizable powder in the transparent plastic material of the invention; and FIG. 4 is a perspective elevational view of a modified form of the invention in which the ends of the sections of magnetizable light controlling material are curved to slidably engage one another with some frictional contact.

DESCRIPTION OF THE PREFERRED EMBODIMENT

In the form of the invention chosen for illustration and description herein the magnetic sun visor attachment may best be seen in FIG. 1 of the drawings and wherein a swingable arm 10 is attached by a bracket 11 to a portion 12 of a vehicle. A conventional sun visor 13 is movably affixed to the arm 10 as will be understood by those skilled in the art. A section 14 of magnetizable material or ferrous sheet metal is attached to or formed on the visor 13 and takes the form of an elongated strip extending across the inner surface of the visor 13, that surface which is visible when the visor is in depending relation to the arm 10.

Still referring to FIG. 1, it will be seen that a plurality of generally rectangular sections 15 of glare controlling magnetizable transparent material are illustrated as being positioned in partially superimposed relation with respect to one another and the section 14 of magnetizable material on the visor 13.

In FIG. 1 of the drawings, three such sections 15 are shown, the first overlapping the section 14 of magnetizable material and the other two sections each overlying the other progressively so that a glare controlling visor extension of considerable depth as compared with the visor 13 results.

In FIG. 1 of the drawings, the lowermost section 15 is shown disposed at an angle and it will be obvious that any of the sections 15 can be positioned at any desired angle to the other or the section 14 of magnetizable material on the visor 13 or they can all be stacked on the section 14 of magnetizable material so that they do not depend below the lowermost portion of the visor 13. In such condition the visor 13 may be folded up against the ceiling liner of the vehicle with the magnetic sun visor attachment completely concealed thereby.

In FIG. 2 of the drawings, an end elevation of the assembly shown in FIG. 1 may be seen, the thicknesses of the sections of light controlling transparent shaded plastic material 15 being emphasized as the actual thickness of such sections may be quite thin as will occur to those skilled in the art.

In FIG. 3 of the drawings, a portion of one of the sections 15 of magnetizable light controlling transparent material may be seen and the shading 16 indicates the presense of the finely powdered ALNICO or iron material imparting both light control and magnetizable properties to the section of otherwise transparent plastic material 15.

Modifications of the invention hereinbefore described will occur to those skilled in the art and one such modification is illustrated in FIG. 4 of the drawings. By referring thereto it will be seen that a visor arm 17 is shown with a visor 18 movably mounted thereon. The ends of the visor 18 are arcuate in cross section as indicated by the numeral 19 and one or more similarly formed sections 20 of light controlling transparent plastic material loaded with a desired amount of ALNICO or ferrous powder and magnetized are slidably engaged thereover. The ends of the additional sections 20 are arcuate in cross section and indicated by the numerals 21.

It is believed that the glare controlling magnetizable material sections 15 of the form of the invention shown in FIG. 1 and the comparable sections 20 as shown in FIG. 4 of the drawings, may be formed of an optical grade acrylic resin in which ALNICO and/or iron or other magnetizable metallic powder are present in amounts between 15% and 45% by weight. The varying of the amount of the powdered magnetizable material in the resin controls the amount of light passed by the otherwise transparent resin and thus affords a convenient and inexpensive way of shading or clouding the transparent material to effect a desired degree of glare shielding.

The foregoing is considered as illustrative only of the principals of the invention. Further since numerous modifications and changes will readily occur to those skilled in the art it is not desired to limit the invention to the exact construction and operation shown and described and accordingly all suitable modifications and equivalents may be resorted to falling within the scope of the invention.

What I claim as new follows:

1. A magnetizable sun visor attachment for a vehicle visor comprising in combination a section of magnetizable material on said visor and at least one section of shaded transparent magnetizable material for self-adhering relation to said section of magnetizable material on said visor, said shaded transparent magnetizable material comprising a sheet of transparent plastic having a known quantity of a magnetizable material therein so as to reduce light transmission through said sheet of plastic by at least 25%.

2. The magnetic sun visor attachment for a vehicle sun visor set forth in claim 1 and wherein the section of shaded transparent magnetizable material comprises acrylic resin having powdered ALNICO material therein in an amount equal to at least 10% by weight.

3. The magnetic sun visor for a vehicle sun visor set forth in claim 1 and wherein the section of shaded transparent magnetizable material comprises acrylic resin having powdered ferrous metal therein in an amount equal to at least 10% by weight.

4. The magnetic sun visor for a vehicle sun visor set forth in claim 1 and wherein said section of shaded transparent magnetizable material comprises a normally clear transparent synthetic resin and a surface coating thereon of a powdered magnetic material, said powdered magnetic material being present in a quantity sufficient when magnetized to cause said section of material to adhere to a magnetizable article.

* * * * *